US009773185B2

(12) United States Patent

Kanda

(10) Patent No.: US 9,773,185 B2

(45) Date of Patent: Sep. 26, 2017

(54) IMAGE PROCESSING APPARATUS, IMAGE PROCESSING METHOD, AND COMPUTER READABLE RECORDING DEVICE

(75) Inventor: Yamato Kanda, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 13/551,798

(22) Filed: Jul. 18, 2012

(65) Prior Publication Data

US 2013/0028470 A1 Jan. 31, 2013

(30) Foreign Application Priority Data

Jul. 29, 2011 (JP) ................................ 2011-167268

(51) Int. Cl.

*G06K 9/00* (2006.01)
*G06K 9/34* (2006.01)

(Continued)

(52) U.S. Cl.

CPC ......... *G06K 9/342* (2013.01); *G06K 9/00751* (2013.01); *G06K 9/4652* (2013.01); *G06T 7/246* (2017.01); *G06K 9/00087* (2013.01); *G06K 9/3216* (2013.01); *G06K 9/3233* (2013.01); *G06K 9/3241* (2013.01); *G06K 9/4609* (2013.01); *G06K 9/4647* (2013.01); *G06T 2207/10016* (2013.01);

(Continued)

(58) Field of Classification Search

CPC ............. G06K 9/00087; G06K 9/3216; G06K 9/3233; G06K 9/3241; G06K 9/4609; G06K 9/4647; G06K 9/342; G06K 9/00751; G06K 9/4652; G06T 7/246

USPC .......................... 382/103, 128, 195; 128/922

See application file for complete search history.

(56) References Cited

U.S. PATENT DOCUMENTS

2003/0195883 A1 10/2003 Mojsilovic et al.
2009/0010551 A1* 1/2009 Matsuda ................ A61B 1/041 382/228

(Continued)

FOREIGN PATENT DOCUMENTS

EP 2 070 466 A1 6/2009
JP 2000-261741 A 9/2000

(Continued)

OTHER PUBLICATIONS

Japanese Office Action dated Jul. 7, 2015 issued in corresponding Japanese Patent Application No. 2011-167268.

(Continued)

*Primary Examiner* — Kenny Cese

(74) *Attorney, Agent, or Firm* — Scully, Scott, Murphy & Presser, P.C.

(57) ABSTRACT

An image processing apparatus includes a corresponding region connecting unit that connects regions that depict the same target between a series of images captured in time series, thereby sets at least one connected region; a connected region feature data calculation unit that calculates feature data of the connected region; a digest index value calculation unit that calculates a digest index value corresponding to a degree at which the target depicted in the series of images is aggregated in each image of the series of images, based on the feature data; and a digest image detector that detects a digest image based on the digest index value.

24 Claims, 12 Drawing Sheets

(51) Int. Cl.

| | |
|---|---|
| ***G06K 9/46*** | (2006.01) |
| ***G06T 7/246*** | (2017.01) |
| *G06K 9/32* | (2006.01) |

(52) U.S. Cl.

CPC ............... *G06T 2207/10024* (2013.01); *G06T 2207/10068* (2013.01); *G06T 2207/30028* (2013.01)

(56) References Cited

U.S. PATENT DOCUMENTS

| | | | | |
|---|---|---|---|---|
| 2009/0022400 | A1* | 1/2009 | Matsuzaki ........ | G06F 17/30781 382/190 |
| 2009/0141960 | A1* | 6/2009 | Yamamoto ......... | G01N 21/6458 382/133 |
| 2009/0202124 | A1* | 8/2009 | Matsuda ............... | G06T 7/0012 382/128 |
| 2009/0252390 | A1* | 10/2009 | Matsuzaki ............ | G06T 7/2053 382/128 |
| 2010/0092091 | A1* | 4/2010 | Kanda .................... | A61B 1/041 382/190 |
| 2010/0183204 | A1* | 7/2010 | Kanda ........................... | 382/128 |
| 2010/0296701 | A1* | 11/2010 | Hu ..................... | G06K 9/00335 382/103 |
| 2010/0322475 | A1* | 12/2010 | Ikeda .................... | G06T 7/2053 382/103 |
| 2012/0033933 | A1* | 2/2012 | Suzuki .......................... | 386/230 |
| 2012/0057766 | A1* | 3/2012 | Drozdzal et al. ............. | 382/128 |

FOREIGN PATENT DOCUMENTS

| | | | |
|---|---|---|---|
| JP | 2006-320650 | A | 11/2006 |
| JP | 2009-160298 | A | 7/2009 |
| JP | 2011-024727 | A | 2/2011 |
| WO | WO 2008/041401 | A1 | 4/2008 |

OTHER PUBLICATIONS

Japanese Office Action dated Apr. 21, 2015 issued in corresponding Japanese Patent Application No. 2011-167268.

Hai, V. et al., "Adaptive Control of Video Display for Diagnostic Assistance by Analysis of Capsule Endoscopic Images", The 18th International Conference on Pattern Recognition, Jan. 1, 2006, pp. 980-983.

Mackiewicz, M. et al., "Wireless Capsule Endoscopy Color Video Segmentation", IEEE Transactions on Medical Imaging, Dec. 1, 2008, vol. 27, No. 12, pp. 1769-1781.

Li, B. et al., "Motion Analysis for Capsule Endoscopy Video Segmentation", Proceeding of the IEEE International Conference on Automation and Logistics (ICAL), Aug. 15, 2011, pp. 46-51.

Extended European Search Report dated Aug. 9, 2016 in related European Application No. 12 00 5461.4.

* cited by examiner

FIG.3

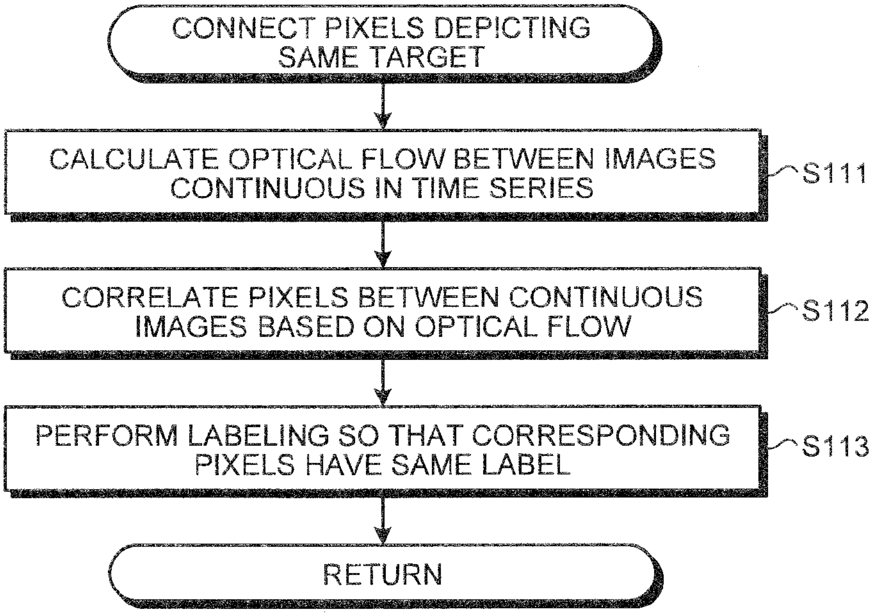

FIG.4

PIXEL CORRESPONDENCE INFORMATION BETWEEN CONTINUOUS IMAGES

<table>
<tr><th>IMAGE $I_0$</th><th>IMAGE $I_1$</th><th>IMAGE $I_1$</th><th>IMAGE $I_2$</th><th>IMAGE $I_2$</th><th>IMAGE $I_3$</th><th>IMAGE $I_n$</th><th>IMAGE $I_{n+1}$</th></tr>
<tr><td>P(0,0)</td><td>P(0,0)</td><td>P(0,0)</td><td>P(0,0)</td><td>P(0,0)</td><td></td><td>...</td><td>...</td></tr>
<tr><td rowspan="2">P(0,1)</td><td>P(0,1)</td><td>P(0,1)</td><td>P(0,1)</td><td></td><td>P(0,0)</td><td>...</td><td>...</td></tr>
<tr><td>P(0,2)</td><td rowspan="2">P(0,2)</td><td>P(0,2)</td><td>P(0,1)</td><td rowspan="2">P(0,1)</td><td>...</td><td>...</td></tr>
<tr><td>P(0,2)</td><td></td><td>P(0,3)</td><td>P(0,2)</td><td>...</td><td>...</td></tr>
<tr><td></td><td>P(0,3)</td><td rowspan="2">P(0,3)</td><td>P(0,4)</td><td>P(0,3)</td><td rowspan="2">P(0,2)</td><td>...</td><td>...</td></tr>
<tr><td>P(0,3)</td><td>P(0,4)</td><td>P(0,5)</td><td>P(0,4)</td><td>...</td><td>...</td></tr>
<tr><td>...</td><td>...</td><td>...</td><td>...</td><td>...</td><td>...</td><td>...</td><td>...</td></tr>
</table>

FIG.5

CONNECTED REGION LABELING INFORMATION

<table>
<tr><th>IMAGE $I_0$</th><th>IMAGE $I_1$</th><th>IMAGE $I_1$</th><th>IMAGE $I_2$</th><th>IMAGE $I_2$</th><th>IMAGE $I_3$</th><th>IMAGE $I_n$</th><th>IMAGE $I_{n+1}$</th></tr>
<tr><td>P(0,0):1</td><td>P(0,0):1</td><td>P(0,0):1</td><td>P(0,0):1</td><td>P(0,0):1</td><td></td><td>···</td><td>···</td></tr>
<tr><td rowspan="2">P(0,1):2</td><td>P(0,1):2</td><td>P(0,1):2</td><td>P(0,1):2</td><td></td><td>P(0,0):6</td><td>···</td><td>···</td></tr>
<tr><td>P(0,2):2</td><td rowspan="2">P(0,2):2</td><td>P(0,2):2</td><td>P(0,1):2</td><td rowspan="2">P(0,1):2</td><td>···</td><td>···</td></tr>
<tr><td>P(0,2):3</td><td></td><td>P(0,3):2</td><td>P(0,2):2</td><td>···</td><td>···</td></tr>
<tr><td></td><td>P(0,3):4</td><td rowspan="2">P(0,3):4</td><td>P(0,4):4</td><td>P(0,3):2</td><td>P(0,2):2</td><td>···</td><td>···</td></tr>
<tr><td>P(0,3):5</td><td>P(0,4):5</td><td>P(0,5):4</td><td>P(0,4):4</td><td>P(0,3):4</td><td>···</td><td>···</td></tr>
<tr><td>···</td><td>···</td><td>···</td><td>···</td><td>···</td><td>···</td><td>···</td><td>···</td></tr>
</table>

FIG.6

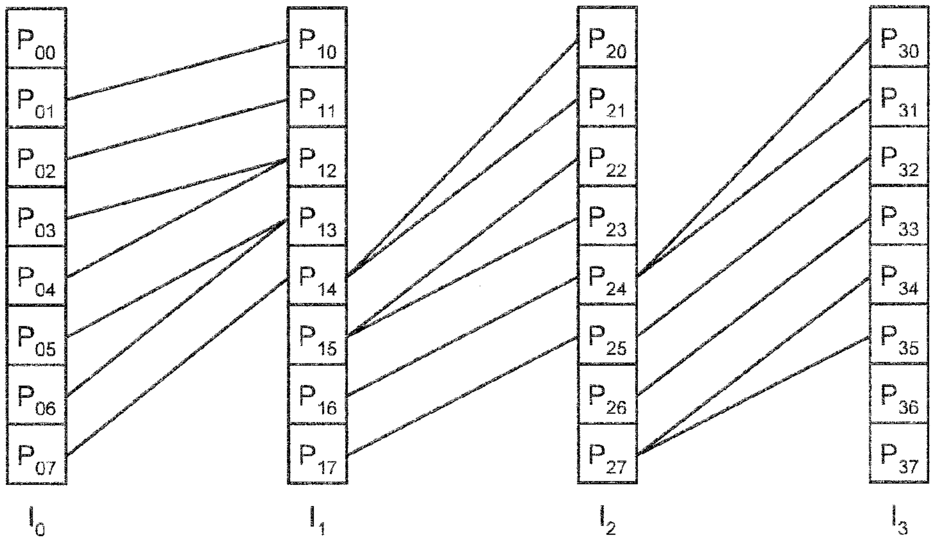

IMAGE PROCESSING APPARATUS, IMAGE PROCESSING METHOD, AND COMPUTER READABLE RECORDING DEVICE

CROSS-REFERENCE TO RELATED APPLICATIONS

This application is based upon and claims the benefit of priority from Japanese Patent Application No. 2011-167268, filed on Jul. 29, 2011, the entire contents of which are incorporated herein by reference.

BACKGROUND OF THE INVENTION

1. Field of the Invention

The present invention relates to an image processing apparatus, an image processing method, and a computer readable recording device that detect a digest image obtained by abstracting a series of images captured in time series.

2. Description of the Related Art

In an examination using a capsule endoscope that is introduced into a subject to capture images of the inside of a lumen, imaging is performed for about eight hours at an imaging frame rate of 2 to 4 frames/sec., for example. As a result, a large amount (several tens of thousands of) images that are captured in times series are obtained during one examination. These images may include a redundant scene which is obtained as a result of depicting the same imaging target in a plurality of frames due to continuous imaging performed when the capsule endoscope remains in one place for a while, for example. For this reason, to efficiently evaluate a series of images, it is important to detect a digest image representing a digest of these images.

As a technique involving the detection of a digest image, WO 2008/041401, for example, discloses an image processing apparatus that extracts an image from a series of continuous images, in which an amount of change between continuous images is calculated in time series, and a predetermined number of images which are arranged in decreasing order of change amount are extracted from the series of images as images including a scene to be detected.

SUMMARY OF THE INVENTION

An image processing apparatus according to an aspect of the present invention includes: a corresponding region connecting unit that connects regions that depict the same target between a series of images captured in time series, thereby sets at least one connected region; a connected region feature data calculation unit that calculates feature data of the connected region; a digest index value calculation unit that calculates a digest index value corresponding to a degree at which the target depicted in the series of images is aggregated in each image of the series of images, based on the feature data; and a digest image detector that detects a digest image based on the digest index value.

An image processing method according to another aspect of the present invention includes: connecting regions depicting the same target among a series of images captured in time series, thereby setting at least one connected region; calculating feature data of the connected region; calculating a digest index value corresponding to a degree at which targets depicted in the series of images are aggregated in each image of the series of images, based on the feature data; and detecting a digest image based on the digest index value.

A computer readable recording device according to still another aspect of the present invention has an executable program stored thereon, wherein the program instructs a processor to perform: connecting regions depicting the same target among a series of images captured in time series, thereby setting at least one connected region; calculating feature data of the connected region; calculating a digest index value corresponding to a degree at which targets depicted in the series of images are aggregated in each image of the series of images, based on the feature data; and detecting a digest image based on the digest index value.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart illustrating processing for connecting pixels depicting the same target illustrated in FIG. 2;

FIG. 4 is a table illustrating an example of pixel correspondence information between continuous pixels;

FIG. 5 is a table illustrating an example of connected region labeling information;

FIG. 6 is a model diagram illustrating regions of pixels connected as a result of labeling processing in images that are continuous in time series;

DETAILED DESCRIPTION OF THE PREFERRED EMBODIMENTS

Figure 1:
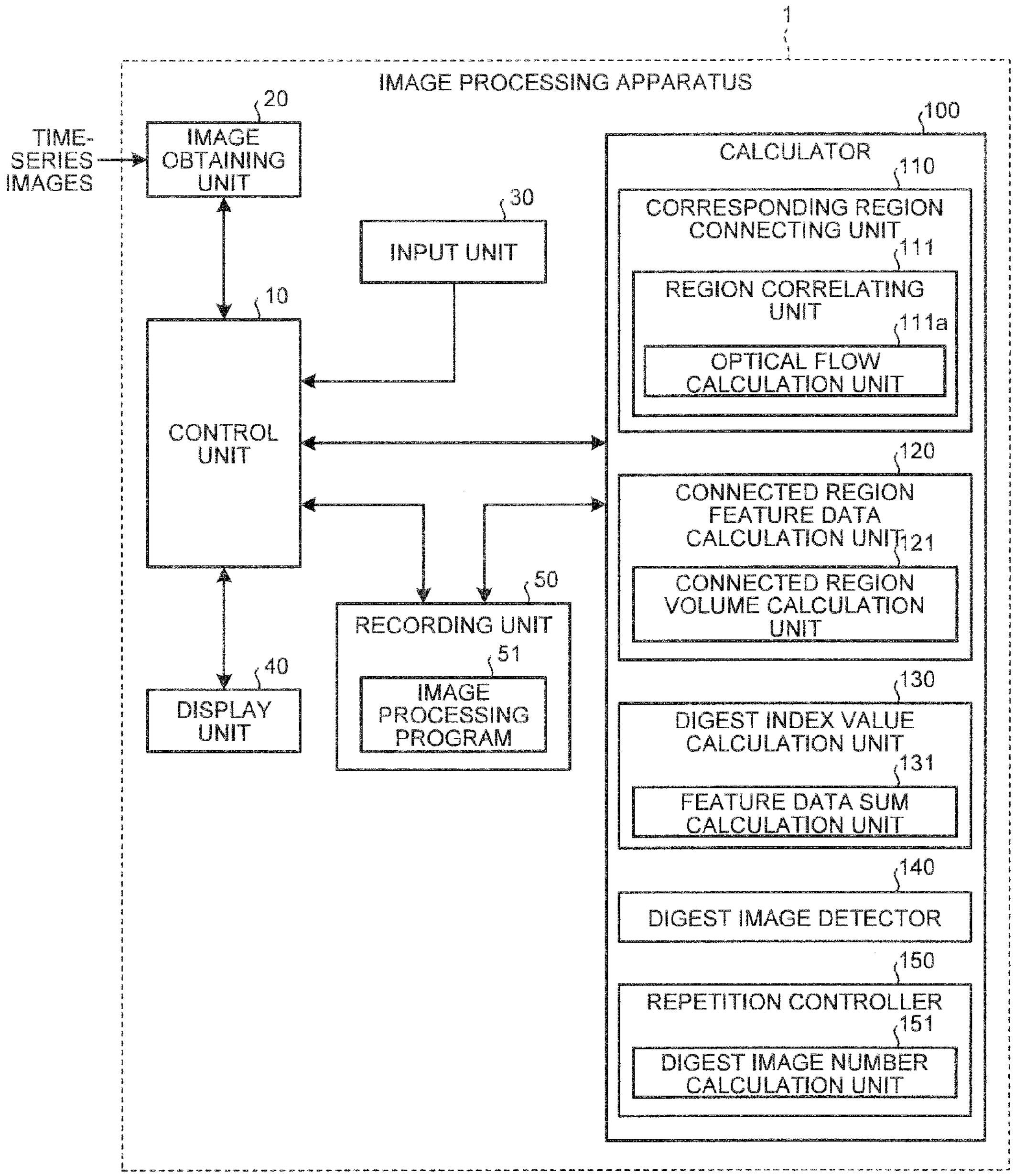
FIG. 1 is a block diagram illustrating a configuration of an image processing apparatus according to a first embodiment of the present invention.

Hereinafter, an image processing apparatus, an image processing method, and an image processing program according to an embodiment of the present invention will be described with reference to the drawings. Note that the present invention is not limited to these embodiments. Additionally, in the illustration of the drawings, the same elements are denoted by the same reference numerals.

In the following embodiments, a description is given of processing for a series of images of the inside of a lumen which are obtained by capturing images of the inside of a lumen of a subject in time series by a medical observation apparatus such as a capsule endoscope, as one example. Note that the images to be subjected to image processing in the following embodiments are color images having pixel levels (pixel values) respectively corresponding to color components of R (red), G (green), and B (blue) at positions of pixels, for example. The present invention is not limited to the images of the inside of a lumen, but can also be widely applied to the case of detecting a digest image from a series of images obtained by other typical image obtaining apparatuses.

First Embodiment

FIG. 1 is a block diagram illustrating a configuration of an image processing apparatus according to a first embodiment of the present invention. An image processing apparatus 1 illustrated in FIG. 1 includes a control unit 10 that controls the overall operation of the image processing apparatus 1; an image obtaining unit 20 that obtains image data corresponding to a series of images (hereinafter, referred to also as "time-series images") which are captured in time series by a medical observation apparatus such as a capsule endoscope; an input unit 30 that receives an input signal externally provided; a display unit 40 that performs various kinds of display; a recording unit 50 that records the image data obtained by the image obtaining unit 20 and various programs; and a calculator 100 that executes predetermined image processing on the image data.

The control unit 10 is implemented by hardware such as a CPU, and reads various programs stored in the recording unit 50 to transfer an instruction or data to each of units, which constitute the image processing apparatus 1, according to the image data received from the image obtaining unit 20 or an actuating signal received from the input unit 30, for example, thereby controlling the overall operation of the image processing apparatus 1 in an integrated manner.

The image obtaining unit 20 is appropriately formed according to a mode of a system including the medical observation apparatus. For example, when the medical observation apparatus is a capsule endoscope and when a portable recording medium is used to deliver the image data from the medical observation apparatus, the image obtaining unit 20 is formed of a reader device which is detachably mounted with the recording medium and which reads the stored image data representing images of the inside of a lumen. In the case of installing a server for storing the image data representing the images of the inside of a lumen which are captured by the medical observation apparatus, the image obtaining unit 20 is formed of a communication device or the like to be connected to the server, and obtains the image data representing the images of the inside of a lumen through data communication with the server. Alternatively, the image obtaining unit 20 may be formed of an interface device or the like that receives an image signal through a cable from the medical observation apparatus such as an endoscope.

The input unit 30 is implemented by an input device, such as a keyboard, a mouse, a touch panel, or various switches, for example, and outputs the received input signal to the control unit 10.

The display unit 40 is implemented by a display device such as an LCD or an EL display, and displays various screens including the images of the inside of a lumen, under the control of the control unit 10.

The recording unit 50 is implemented by various IC memories such as flash memories which can be updated and recorded, such as a ROM and a RAM, a hard disk to be built in or connected with a data communication terminal, an information recording medium, such as a CD-ROM, a reading device that reads the recording medium, and the like. The recording unit 50 stores the image data representing the images of the inside of a lumen, which are obtained by the image obtaining unit 20, as well as programs for causing the image processing apparatus 1 to operate and for causing the image processing apparatus 1 to execute various functions, data used during the execution of these programs, and the like. Specifically, the recording unit 50 stores an image processing program 51 for executing processing of detecting a digest image from time-series images.

The calculator 100 is implemented by hardware such as a CPU, and reads the image processing program 51 to thereby perform image processing on the image data corresponding to the time-series images, and performs various calculation processes for detecting a digest image from the time-series images.

Next, the detailed configuration of the calculator 100 will be described.

As illustrated in FIG. 1, the calculator 100 includes a corresponding region connecting unit 110 that connects regions depicting the same target among a series of time-series images, thereby sets at least one connected region; a connected region feature data calculation unit 120 that calculates feature data of each connected region; a digest index value calculation unit 130 that calculates a digest index value based on the feature data; a digest image detector 140 that detects a digest image based on the digest index value; and a repetition controller 150 that controls repetition of processing in each of the digest index value calculation unit 130 and the digest image detector 140. Note that when a plurality of targets is depicted in the time-series images, a plurality of connected regions can be set.

The corresponding region connecting unit 110 includes a region correlating unit 111 that correlates regions included in each image among the images continuous in time series, and connects the regions depicting the same target in each image and between images based on the correlation result. More specifically, the region correlating unit 111 includes an optical flow calculation unit 111*a* that calculates an optical flow between the images that are continuous in time series, and correlates the regions between the images based on the optical flow.

The connected region feature data calculation unit 120 includes a connected region volume calculation unit 121 that calculates the volume of each connected region which is the sum of the number of pixels included in each connected region. The volume of each connected region is used as the feature data.

The digest index value calculated by the digest index value calculation unit 130 corresponds to a degree at which the targets depicted in the time-series images are aggregated in each image among the time-series images. The digest index value calculation unit 130 includes a feature data sum calculation unit 131 that calculates, for each image, the sum of the feature data of each connected region included in each image, and the sum of the feature data is used as the digest index value.

The repetition controller 150 includes a digest image number calculation unit 151 that calculates the number of detected digest images, and controls repetition of processing in each of the digest index value calculation unit 130 and the digest image detector 140 according to the number of digest images.

Figure 2:
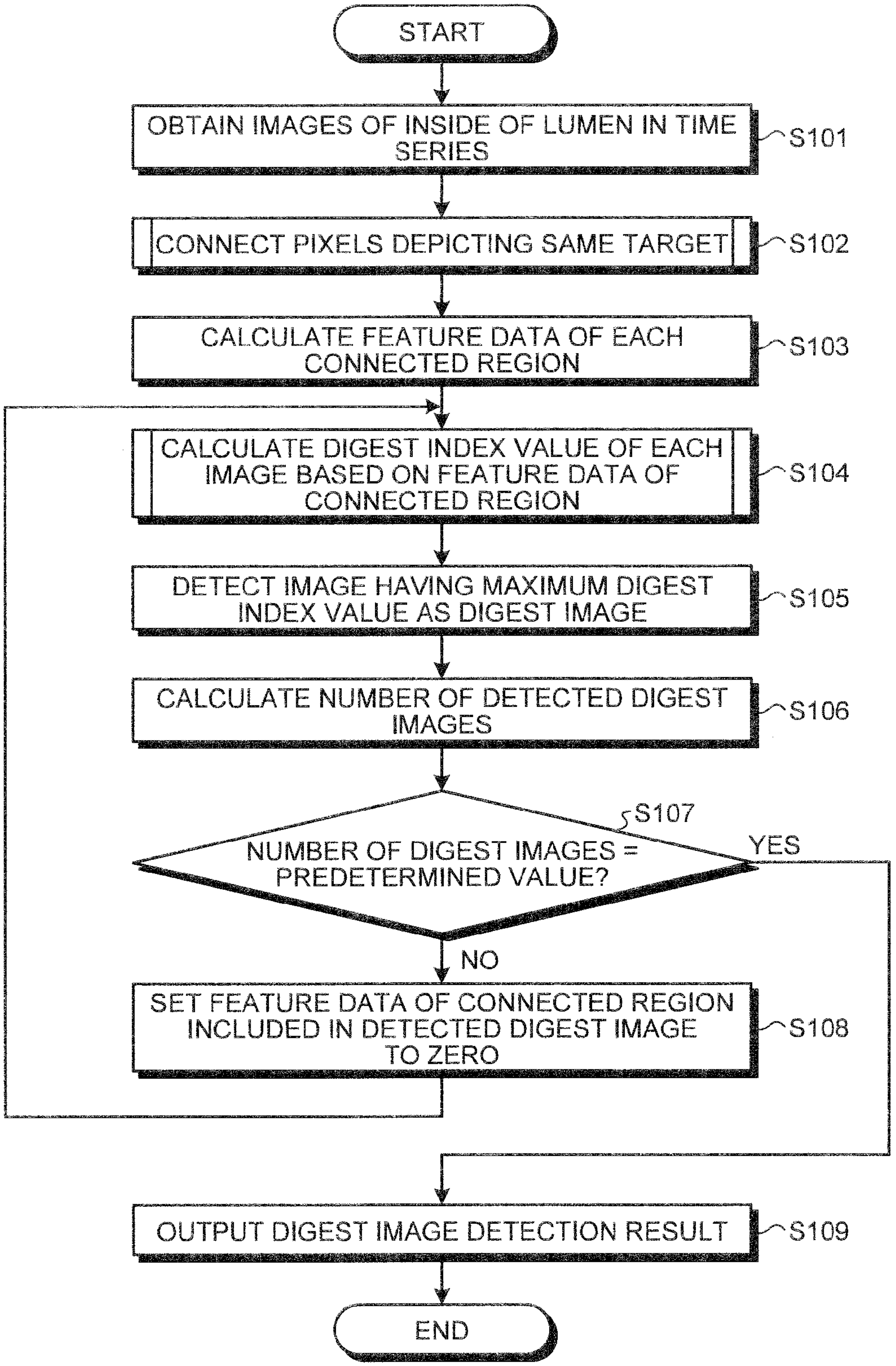
FIG. 2 is a flowchart illustrating processing executed by the image processing apparatus illustrated in FIG. 1.

Next, processing executed by the image processing apparatus 1 will be described. FIG. 2 is a flowchart illustrating the processing executed by the image processing apparatus 1.

First, in step S101, the image obtaining unit 20 obtains a series of images of the inside of a lumen (hereinafter referred to simply as "images") which are obtained by capturing images of the inside of a lumen of a subject in times series, and stores the obtained images in the recording unit 50. The calculator 100 sequentially reads the images to be subjected to image processing from the recording unit 50.

In the subsequent step S102, the corresponding region connecting unit 110 connects pixels depicting the same target in a plurality of images.

FIG. 3 is a flowchart illustrating details of the processing (step S102) of connecting the pixels depicting the same target.

First, in step S111, the optical flow calculation unit 111*a* calculates the optical flow between the images that are continuous in time series. The term "optical flow" herein described refers to vector data representing a shift amount obtained by correlating the same targets in two images captured at different times. In the first embodiment, the optical flow is calculated using a well-known optical flow calculation method (more specifically, block matching method or a gradient method) with respect to a G component in a pixel value of the image of the inside of a lumen (see: CG-ARTS Society, "Digital Image Processing," pages 243 to 245)). Alternatively, the optical flow may be calculated using a well-known technique such as Lucas-Kanade tracking (see: B. D. Lucas and T. Kanade, "An Iterative Image Registration Technique with an Application to Stereo Vision," Proceedings of the 7th International Joint Conference on Artificial Intelligence, pages 674-679, 1981).

Herein, the G component is used because the G component is close to the light absorbing band of blood and thus is excellent in representation of configuration information of an image of the inside of a lumen, such as pathology, mucosa, a boundary between contents, and the like. Instead of the G component, other color components (R component or B component) of pixel values, and values secondarily calculated from the pixel values by well-known conversion, specifically, luminance, color difference (YCbCr conversion), hue, chroma, brightness (HSI conversion), color ratio, and the like may also be used.

In the subsequent step S112, the region correlating unit 111 correlates the pixels between the continuous images based on the optical flow. Specifically, the following processing is carried out. That is, the region correlating unit 111 obtains a corresponding coordinate ($x_{t1}$, $y_{t1}$) (where $x_{t1}$ and $y_{t1}$ are real numbers) in the subsequent image in time series with respect to a pixel coordinate ($x_{t0}$, $y_{t0}$) (where $x_{t0}$ and $y_{t0}$ are natural numbers) of the previous image in times series based on the optical flow, and also obtains a corresponding coordinate ($x_{t0}'$, $y_{t0}'$) (where $x_{t0}'$ and $y_{t0}'$ are real numbers) in the previous image in time series with respect to a pixel coordinate ($x_{t1}'$, $y_{t1}'$) (where $x_{t1}'$ and $y_{t1}'$ are natural numbers) in the subsequent image in time series. Then, the pixels corresponding to each other in the previous and subsequent images in time series are determined, and the pixel correspondence information between the continuous images is created.

At this time, when the coordinates (real numbers) in the other image corresponding to a plurality of pixels in one image are concentrated in the vicinity of one pixel coordinate (natural number), the region correlating unit 111 correlates a predetermined number of pixels in one image, the coordinate of which is closer to the pixel coordinate, with the pixel coordinate. Then, the other pixels are assumed as pixels of a target portion which is not depicted in the other image while being depicted in one image, and thus the other pixels are not correlated.

Note that the coordinates are not necessarily correlated in one-to-one correspondence. This is because the images may be enlarged or reduced depending on the distance between the capsule endoscope and the imaging target (for example, a mucosa surface) or the angle.

Further, the correspondence in the forward direction in time series (the coordinate of the subsequent image corresponding to the pixel of the previous image) and the correspondence in the opposite direction (the coordinate of the previous image corresponding to the pixel of the subsequent image) are detected so as to increase the reliability of the corresponding coordinates. Note that in the first embodiment, only the correspondence in one of the forward direction and the opposite direction in time series may be detected.

FIG. 4 is a table illustrating an example of pixel correspondence information between continuous images. This pixel correspondence information indicates a correspondence between pixels included in a previous image $I_n$ and a subsequent image $I_{n+1}$ (n=0, 1, 2, . . . ) in time series. Note that P (x, y) represents a pixel located at a coordinate (x, y) in each image. This pixel correspondence information indicates that pixels written in adjacent rows (for example, a pixel P (0, 1) of an image $I_0$ and P (0, 1) and P (0, 2) of an image $I_1$) are corresponding pixels in adjacent columns. Note that the case where one of the adjacent rows in the adjacent columns is blank indicates that there is no corresponding pixel.

In the following step S113, the corresponding region connecting unit 110 performs labeling so that the corresponding pixels have the same label. More specifically, the corresponding region connecting unit 110 first sets a label value, which is set to a certain pixel, to all corresponding pixels based on the pixel correspondence information. Next, a new label value is set to pixels with no label value set thereto, and the same processing described above is carried out. Such processing is sequentially repeated, thereby performing labeling on all the pixels. Furthermore, the corresponding region connecting unit 110 sets the aggregation of the pixels having the same label value set thereto, as the connected region of the pixels depicting the same target.

FIG. 5 is a table illustrating an example of results (connected region labeling information) of labeling based on the pixel correspondence information illustrated in FIG. 4. In FIG. 5, each value shown next to a colon following each pixel P (x, y) represents a label value set to the pixel P (x, y).

FIG. 6 is a model diagram illustrating regions of pixels connected as a result of labeling processing in four images $I_0$ to $I_3$ that are continuous in time series. In FIG. 6, pixels $P_{00}$ to $P_{07}$, $P_{10}$ to $P_{17}$, $P_{20}$ to $P_{27}$, and $P_{30}$ to $P_{37}$ which are included in the images $I_0$ to $I_3$ are one-dimensionally represented by pixel columns as a simulation. Among these pixels, pixels connected by a line (for example, the pixel $P_{01}$ and the pixel $P_{10}$) are the pixels constituting one connected region.

Note that in steps S111 to S113, description has been made of the case where the processing (pixel correspondence processing and pixel connection processing) for each pixel is executed, the same processing may be performed for each small region including a plurality of pixels. In this case, each image is divided into small regions in advance based on the edge strength or the like. As the method of dividing each image, a technique using a ridge of edge strength as a boundary (for example, see WO 2006/080239), watershed algorithm (see: Luc Vincent and Pierre Soille, "Watersheds in Digital Spaces: An Efficient Algorithm Based on Immersion Simulations," IEEE Transactions on Pattern Analysis and Machine Intelligence, Vol. 13, No. 6, pp. 583-598, June 1991), and the like may be used.

After that, the processing returns to the main routine.

In step S103, the connected region feature data calculation unit 120 calculates feature data of each connected region. More specifically, the connected region volume calculation unit 121 calculates the sum of the number of pixels included in each connected region as the connected region volume. The connected region feature data calculation unit 120 uses the connected region volume as the feature data of each connected region.

Figure 7:
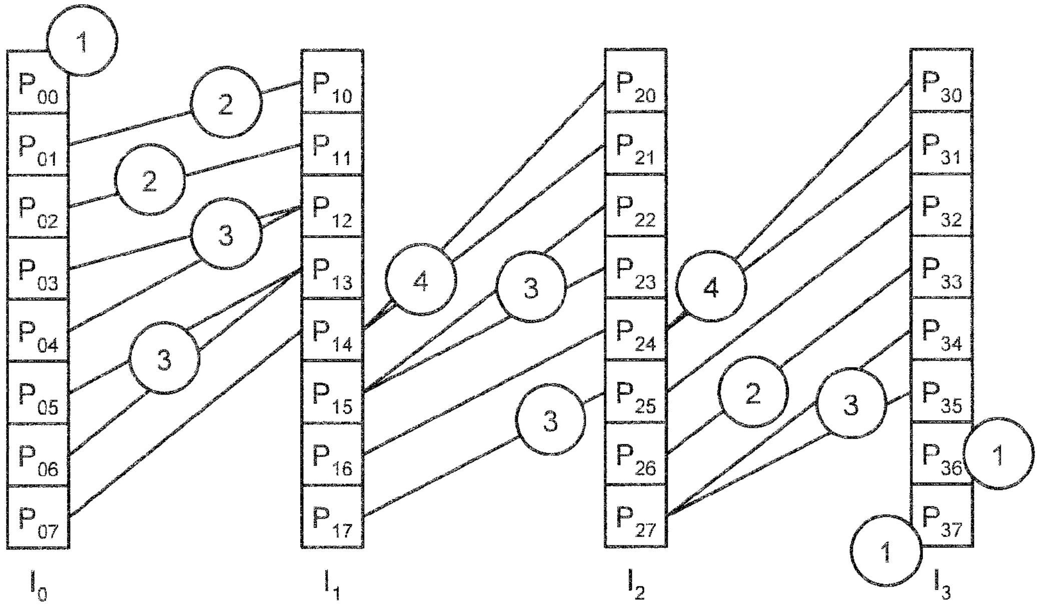
FIG. 7 is a model diagram illustrating results of calculating feature data with respect to each of connected regions illustrated in FIG. 6.

FIG. 7 is a model diagram illustrating results of calculating the feature data with respect to each connected region illustrated in FIG. 6. Each encircled value illustrated in FIG. 7 represents feature data (connected region volume in the first embodiment) of each connected region (connected region including pixels connected by a line on which a circle is located). For example, the volume (the number of pixels) of the connected region including the pixel $P_{07}$ of the image $I_0$, the pixel $P_{14}$ of the image $I_1$, and the pixels $P_{20}$ and $P_{21}$ of the image $I_2$ is "4."

In the subsequent step S104, the digest index value calculation unit 130 calculates the digest index value of each image based on the feature data of the connected region. More specifically, the feature data sum calculation unit 131 calculates, for each image, the sum of the feature data of each connected region included in each image. The sum of the feature data of each connected region is used as the digest index value.

Specifically, a digest index value $E(I_n)$ of the image $I_n$ is given by the following expression (1).

$$E(I_n)=\Sigma F(L_i) \quad (1)$$

In the expression (1), the right side represents the sum of feature data $F(L_i)$ (which is the connected region volume in the first embodiment) of a connected region $L_i$ to which a label value "i" included in the image $I_n$ is set.

Accordingly, in the case of the images $I_0$ to $I_3$ illustrated in FIG. 5, the digest index value $E(I_n)$ is given by the following expressions.

$$E(I_0)=F(L_1)+F(L_2)+F(L_3)+F(L_5)+\ldots$$

$$E(I_1)=F(L_1)+F(L_2)+F(L_4)+F(L_5)+\ldots$$

$$E(I_2)=F(L_1)+F(L_2)+F(L_4)+\ldots$$

$$E(I_3)=F(L_2)+F(L_4)+F(L_6)+\ldots$$

In the model diagram illustrated in FIG. 7, this corresponds to calculation of the sum of the feature data (encircled values) of the connected regions included in the images $I_0$ to $I_3$. That is, the following expressions hold.

$$E(I_0)=1+2+2+3+3+4=15$$

$$E(I_1)=2+2+3+3+4+3+3=24$$

$$E(I_2)=4+3+3+4+2+3=19$$

$$E(I_3)=4+3+2+3+1+1=14$$

In step S105, the digest image detector 140 detects an image having a maximum digest index value as a digest image. This is because an image having a larger digest index value, which is obtained by the calculation method described above, is considered to be an image in which the targets depicted in time-series images are more aggregated. For example, the image $I_1$ whose digest index value $E(I_n)$ is maximum (24) among the four images is detected as the digest image from the images $I_0$ to $I_3$ illustrated in FIG. 7.

Figure 8:
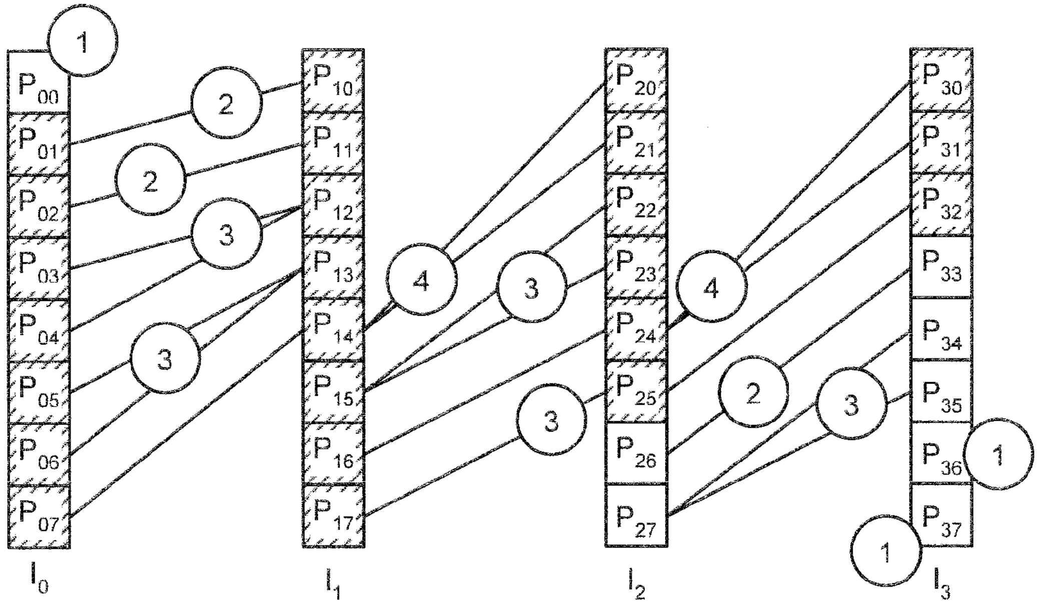
FIG. 8 is a model diagram illustrating relations between digest index values and the aggregation of time-series images.

FIG. 8 is a model diagram illustrating relations between the digest index values and the aggregation of the time-series images. In FIG. 8, the pixels included in the image $I_1$ and the pixels in the other images $I_0$, $I_2$, and $I_3$ corresponding to these pixels are shaded. In this model diagram, when attention is paid to the correspondence between the pixels, it is apparent that the pixels in the image $I_1$ correspond to the most pixels in the images $I_0$ and $I_2$. That is, the image $I_1$ includes the most part of the targets depicted in the images $I_0$ and $I_2$, and thus it can be said that the targets depicted in the time-series images $I_0$ to $I_3$ are most aggregated.

Accordingly, it is confirmed from the model diagram illustrated in FIG. 8 that the image (image $I_1$) having the maximum digest index value is the most appropriate digest image.

In step S106, the digest image number calculation unit 151 of the repetition controller 150 calculates the number of detected digest images (detected number).

In the subsequent step S107, the repetition controller 150 determines whether the number of digest images reaches a predetermined value. As the predetermined value, a desired number can be preliminarily set by a user.

When the number does not reach the predetermined value (step S107: No), the repetition controller 150 recognizes the target corresponding to the connected region included in the detected digest image, as the detected target, and sets the feature data of the connected region of the digest image to zero (step S108). After that, the processing returns to step S104. In this case, the processing (steps S104 and S105 and subsequent steps) for undetected targets in each of the digest index value calculation unit 130 and the digest image detector 140 is repeatedly executed.

Figure 9:
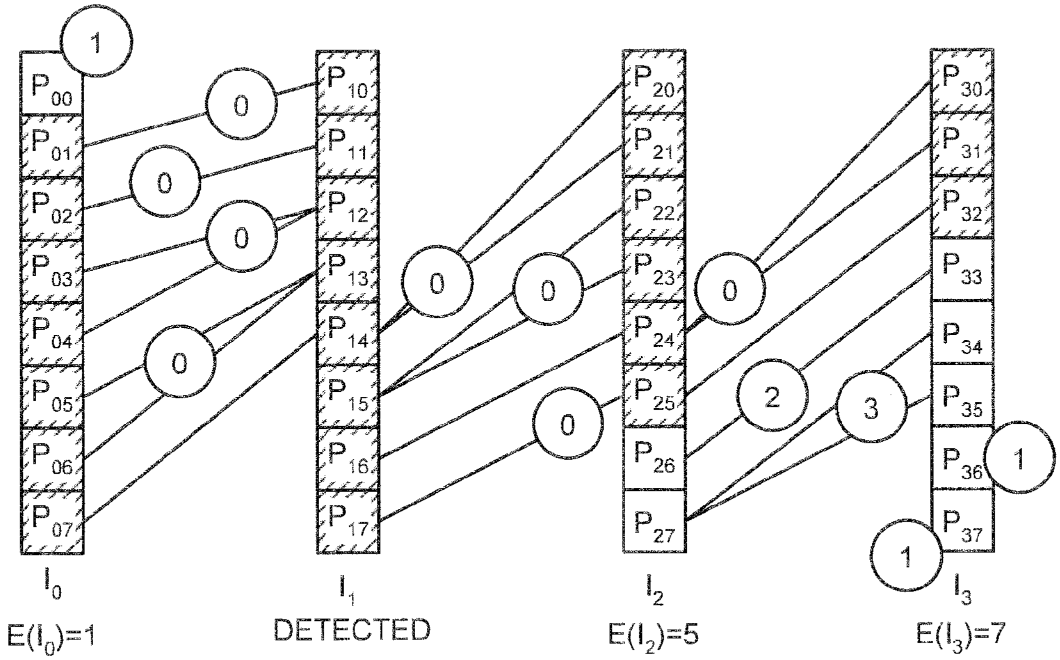
FIG. 9 is a diagram for explaining the reason that a digest image of high coverage characteristic by repetition processing.

Here, the reason that the digest image of high coverage characteristic for the targets depicted in the time series images can be detected by such repetition processing will be described with reference to FIG. 9. In FIG. 9, the feature data of the connected region included in the image $I_1$, which is detected as the digest image, is set to zero. Further, all pixels corresponding to the pixels within the image $I_1$, that is, the pixels depicting the targets aggregated in the digest image are shaded. Thus, it is apparent that the image $I_3$ depicting the most part of uncovered targets is desirably subsequently detected as the digest image.

By the processing of step S104 after the repetition, $E(I_0)=1$, $E(I_2)=2+3=5$, and $E(I_3)=2+3+1+1=7$ are calculated as the digest index value $E(I_n)$ of each image $I_n$(n=0, 2, 3). As a result, the image $I_3$ having the largest (7) digest index value $E(I_n)$ is determined as the digest image to be subsequently detected (step S105 after the repetition). This also matches the concept illustrated in the model diagram of FIG. 9. The digest image of high coverage characteristic for the targets depicted in the time-series images can be detected by further repeating such processing.

On the other hand, in step S107, when the number of digest images reaches the predetermined value (step S107: Yes), the processing shifts to step S109. In this case, the calculator 100 outputs the detection result of the digest image to the display unit 40 and stores the detection result in the recording unit 50. After that, the processing of the image processing apparatus 1 ends.

As described above, according to the first embodiment, the connected region is obtained by connecting the regions depicting the same target in the time-series images, and the digest images in which the targets depicted in the time-series images are aggregated are sequentially detected based on the sum of the volumes of the connected regions included in each image, thereby enabling detection of the digest image of high coverage characteristic for the diagnosis target.

Note that in the first embodiment described above, the repetition controller 150 repeatedly executes the processing in each of the digest index value calculation unit 130 and the digest image detector 140. However, the digest image of high coverage characteristic can be detected also by at least one processing in each of the digest index value calculation unit 130 and the digest image detector 140.

First Modified Example

Figure 10:
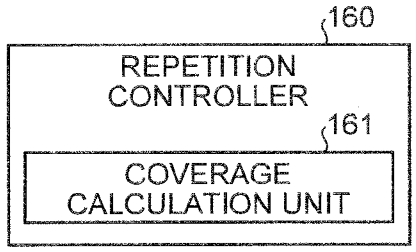
FIG. 10 is a block diagram illustrating a configuration of a repetition controller according to a first modified example.

Next, a first modified example of the first embodiment will be described with reference to FIG. 10.

An image processing apparatus according to the first modified example includes a repetition controller 160 including a coverage calculation unit 161, instead of the repetition controller 150 illustrated in FIG. 1. The coverage calculation unit 161 calculates the coverage of the targets depicted in the time-series images covered by the detected digest image. The repetition controller 160 controls repetition of the processing in each of the digest index value calculation unit 130 and the digest image detector 140 according to this coverage.

Figure 11:
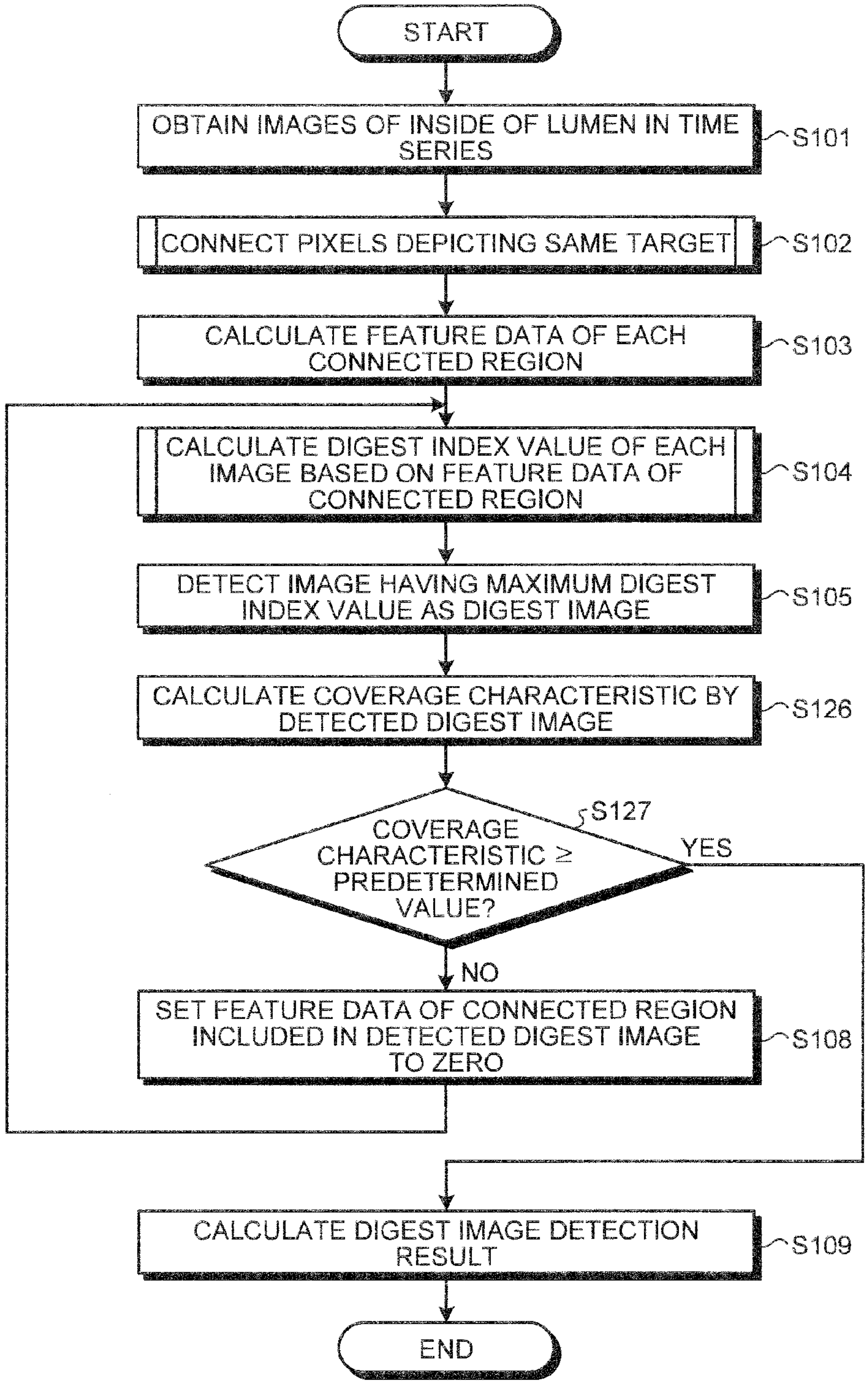
FIG. 11 is a flowchart illustrating processing executed by the image processing apparatus according to the first modified example.

FIG. 11 is a flowchart illustrating the processing executed by the image processing apparatus according to the first modified example. In this flowchart, the processing in steps S101 to S105, S108, and S109 is similar to that of the first embodiment.

In step S126 subsequent to step S105, the coverage calculation unit 161 calculates a coverage $C_R$ by the detected digest image by using the following expression (2).

$$C_R = \frac{\text{the sum of feature data of connected areas existing in a digest image}}{\text{the sum of feature data of all connected areas}} \quad (2)$$

For example, in FIG. 8, when the image $I_1$ is detected as the digest image, a coverage $C_R(I_1)$ by the image $I_1$ is expressed as follows.

$$C_R(I_1)=24/32=0.75$$

Further, in FIG. 9, when the image $I_3$ is detected as the digest image subsequent to the image $I_1$, a coverage $C_R(I_1, I_3)$ by the images $I_1$ and $I_3$ is expressed as follows.

$$C_R(I_1,I_3)=(24+7)/32=0.96875$$

In step S127, the repetition controller 160 determines whether the coverage $C_R$ thus calculated is equal to or greater than a predetermined value. As this coverage, a desired value can be preliminarily set by the user.

When the coverage is smaller than the predetermined value (step S127: No), the repetition controller 160 sets the feature data of the connected region included in the detected digest image to zero (step S108). After that, the processing returns to step S104. In this case, the processing (steps S104 and S105 and subsequent steps) in each of the digest index value calculation unit 130 and the digest image detector 140 is repeatedly executed.

On the other hand, when the coverage is equal to or greater than the predetermined value (step S127: Yes), the processing shifts to step S109.

As described above, according to the first modified example, the coverage by the detected digest image is calculated simultaneously with the detection of the digest image, and the control for repetition of the processing is executed according to the coverage, thereby enabling detection of the digest image having a predetermined coverage or more.

Second Embodiment

Next, a second embodiment of the present invention will be described.

Figure 12:
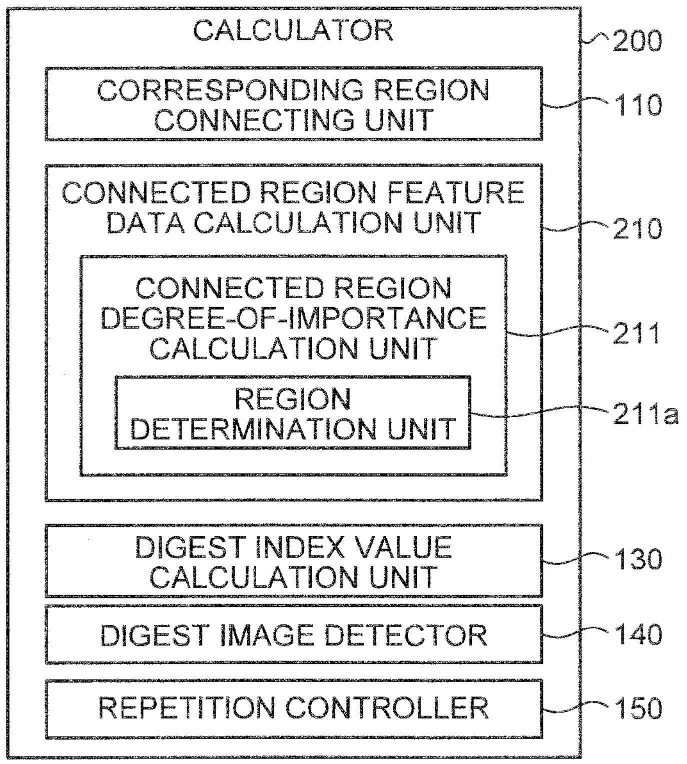
FIG. 12 is a block diagram illustrating a configuration of a calculator according to a second embodiment.

FIG. 12 is a block diagram illustrating a configuration of a calculator included in an image processing apparatus according to the second embodiment. Note that the configurations and operations other than the calculator of the image processing apparatus according to the second embodiment are similar to those illustrated in FIG. 1.

A calculator 200 illustrated in FIG. 12 includes a connected region feature data calculation unit 210 including a connected region degree-of-importance calculation unit 211, instead of the connected region feature data calculation unit 120 illustrated in FIG. 1. The configurations and operations of the other components are similar to those of the first embodiment.

The connected region degree-of-importance calculation unit 211 includes a region determination unit 211*a* that determines each region in each image of a series of time-series images so as to, for example, classify the regions depending on the degree of importance in diagnosis, and calculates the degree of importance of each connected region based on the determination result. The connected region feature data calculation unit 210 uses the calculated degree of importance as the feature data of the connected area.

More specifically, the region determination unit 211*a* determines each region in each image as one of a region to be detected (detection target region), a region to be examined (examination target region), and a region unnecessary for examination (non-examination-target region). Specifically, the region to be detected corresponds to a pathology portion; the region to be examined corresponds to a mucosal region; and the region unnecessary for examination corresponds to a non-mucosal region.

Next, processing executed by the image processing apparatus according to the second embodiment will be described. The processing executed by the image processing apparatus according to the second embodiment is entirely similar to that illustrated in FIG. 2, but the processing of calculating feature data of each connected region (step S103) is different from that of the first embodiment.

Figure 13:
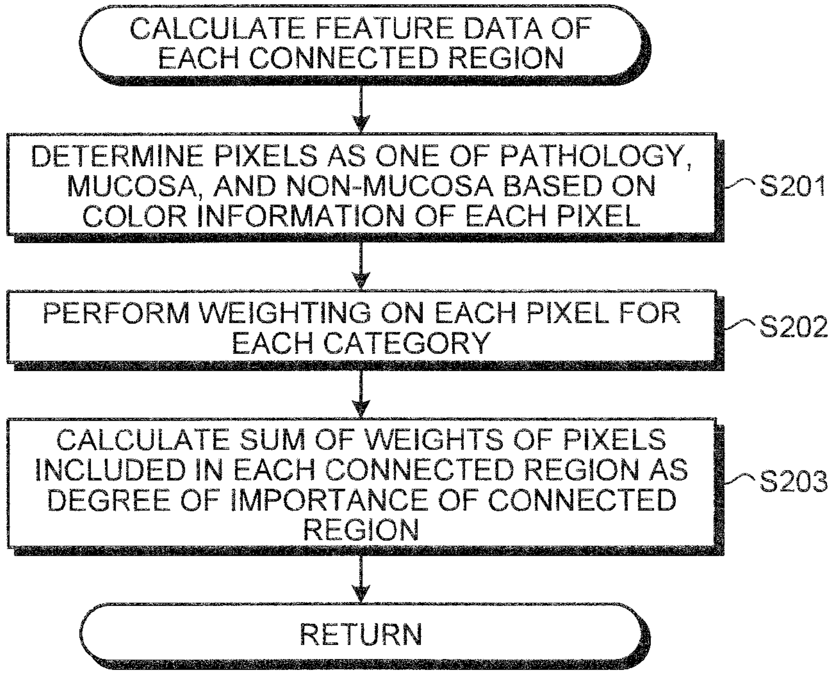
FIG. 13 is a flowchart illustrating processing of calculating feature data of each of connected regions according to the second embodiment.

FIG. 13 is a flowchart illustrating the processing of calculating feature data of each connected region which is executed by the connected region feature data calculation unit 210.

After the corresponding region connecting unit 110 connects the pixels depicting the same target (step S102 in FIG. 2), the region determination unit 211*a* determines each of the pixels as one of the categories of pathology, mucosa, and non-mucosa, based on color information of each pixel (step S201). Note that various well-known methods may be employed as the method of determining the categories (pathology, mucosa, non-mucosa, and the like) of the pixels of the images of the inside of a lumen based on the color information. For example, there is a method in which an image is divided into regions by hierarchically classifying images of the inside of a lumen based on a value of a specific waveform component (for example, R component) of each pixel within the images of the inside of the lumen; the pixel feature data (for example, values of R, G, and B components of the pixels, and values of luminance, color difference, hue, chroma, brightness, color ratio, and the like which are secondarily calculated based on these components) of the pixels in each region is calculated and a distribution of the pixel feature data is subjected to clustering; the cluster of a pathology portion is discriminated by comparing each cluster with a predetermined cluster discrimination criterion; and the pixel belonging to the cluster of the pathology portion are specified as a pathology pixel (see Japanese Laid-open Patent Publication No. 2010-113616).

In the subsequent step S202, the connected region degree-of-importance calculation unit 211 performs weighting on each pixel for each category. This weighting is set such that the pathology pixel has the highest weight; the mucosa pixel has the second highest weight; and the non-mucosa pixel has the lowest weight. This is because the degree of importance of pixels to be covered in the digest image is determined such that the pathology pixel has the highest degree of importance, the mucosa pixel has the second highest degree of importance, and the non-mucosa pixel has the lowest degree of importance. As a specific example, a weight 2 is set to the pathology pixel; a weight 1 is set to the mucosa pixel; and a weight 0 is set to the non-mucosa pixel.

Further, in step S203, the connected region degree-of-importance calculation unit 211 calculates the sum of the weights of the pixels included in each connected region as the degree of importance of connected region. This degree of importance of connected region is used as the feature data in the case of calculating the digest index value of each image (step S104).

After that, the processing returns to the main routine.

As described above, according to the second embodiment, the degree of importance is taken into consideration based on the discrimination results of the regions (the detection target region, the examination target region, and the non-examination-target region) to which the pixels in each image belong. This enables detection of the digest image of high coverage characteristic for the important diagnosis target depicted in the time-series images.

Note that the pixels are discriminated by the processing for each pixel in the second embodiment, but the same processing may be carried out for each small region including a plurality of pixels.

Third Embodiment

Next, a third embodiment of the present invention will be described.

Figure 14:
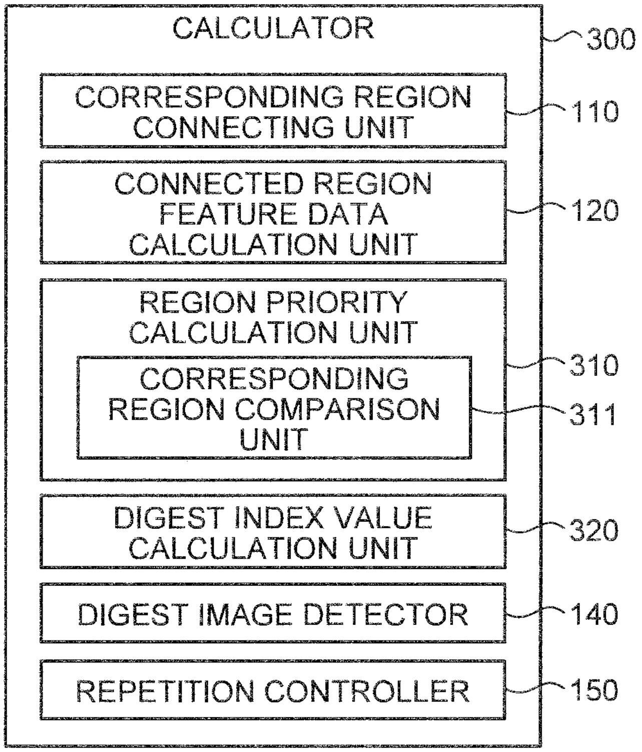
FIG. 14 is a block diagram illustrating a configuration of a calculator according to a third embodiment.

FIG. 14 is a block diagram illustrating a configuration of a calculator included in an image processing apparatus according to the third embodiment. Note that the configurations and operations other than the calculator of the image processing apparatus according to the third embodiment are similar to those illustrated in FIG. 1.

A calculator 300 illustrated in FIG. 14 further includes a region priority calculation unit 310 added to the calculator 100 illustrated in FIG. 1, and also includes a digest index value calculation unit 320 instead of the digest index value calculation unit 130 illustrated in FIG. 1. The configurations and operations of the other components are similar to those of the first embodiment.

The region priority calculation unit 310 calculates a priority of detection of digest images based on the visibility with respect to the regions in each image of a series of time-series images. More specifically, the region priority calculation unit 310 includes a corresponding region comparison unit 311 that compares regions belonging to the same connected region between different images, and calculates the priority described above based on the comparison result of the corresponding region comparison unit 311.

The digest index value calculation unit 320 calculates the digest index value based on the priority calculated by the region priority calculation unit 310 and the region feature data calculated by the connected region feature data calculation unit 120.

Figure 15:
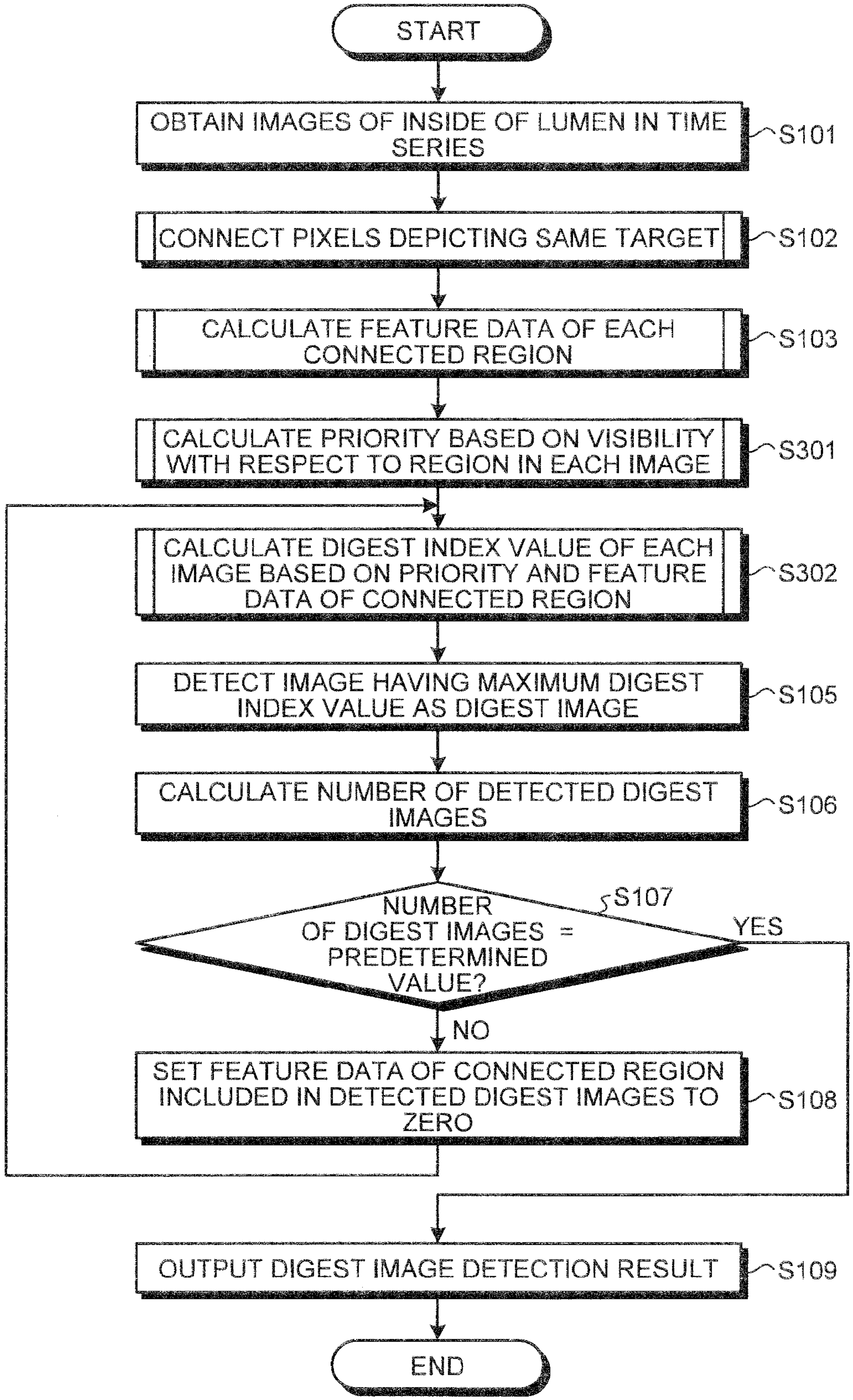
FIG. 15 is a flowchart illustrating processing executed by an image processing apparatus according to the third embodiment.

FIG. 15 is a flowchart illustrating the processing executed by the image processing apparatus according to the third embodiment. In the flowchart, the processing in steps S101 to S103 and S105 to S109 are similar to those of the first embodiment.

In step S301 subsequent to step S103, the region priority calculation unit 310 calculates the priority based on the visibility with respect to the regions in each image.

Figure 16:
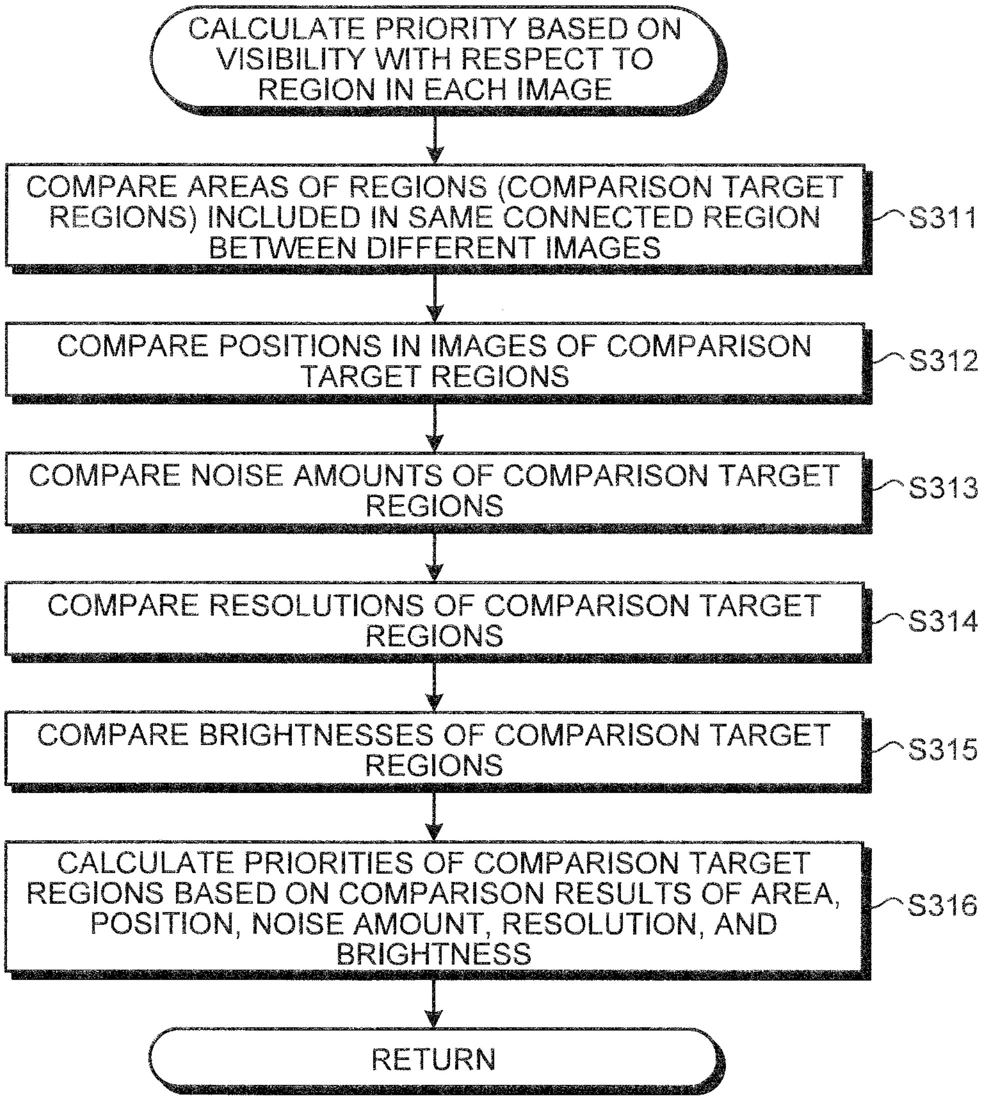
FIG. 16 is a flowchart illustrating processing of calculating a priority based on the visibility with respect to a region in each image illustrated in FIG. 15.

FIG. 16 is a flowchart illustrating details of the processing of calculating the priority based on the visibility (step S301).

Figure 17:
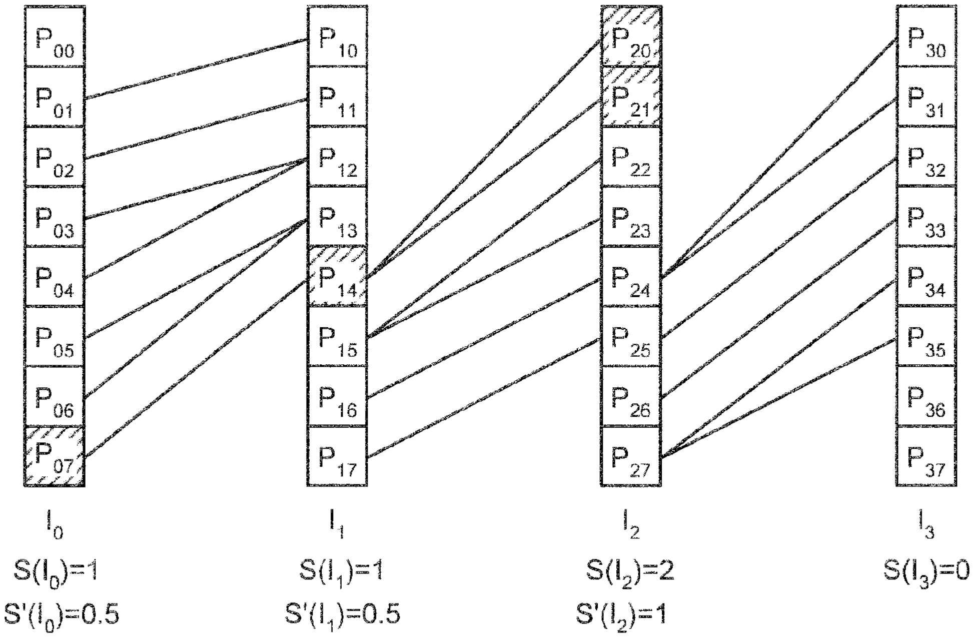
FIG. 17 is a model diagram illustrating an example for comparing the areas of comparison target regions.

First, in step S311, the corresponding region comparison unit 311 compares the areas of each region included in the same connected region (hereinafter referred to as "comparison target region") between different images. FIG. 17 is a model diagram illustrating an example of comparing the areas of comparison target regions. In FIG. 17, attention is paid to one connected region included in the different images $I_0$ to $I_2$, and the comparison target regions (pixels) included in the connected region are shaded.

As illustrated in FIG. 17, the areas (number of pixels) $S(I_n)$ of the comparison target regions in the images $I_0$ to $I_2$ are respectively represented by $S(I_0)=1$, $S(I_1)=1$, and $S(I_2)=2$. When these areas $S(I_n)$ are normalized so that the maximum area of the comparison target regions becomes 1, the normalized values (hereinafter referred to as "area index values") $S'(I_n)$ are respectively represented by $S'(I_0)=0.5$, $S'(I_1)=0.5$, and $S'(I_2)=1$. As the area index value becomes closer to 1, the same target is depicted in a larger size. Accordingly, it can be said that the visibility is excellent. The corresponding region comparison unit 311 calculates the area index value for all the connected regions as the target, thereby obtaining the area index value for each region included in the same connected region in each image.

In the subsequent step S312, the corresponding region comparison unit 311 compares the positions of the comparison target region s in each image between different images. Here, it can be said that comparison target regions closer to the center of the image have higher visibility. Therefore, the corresponding region comparison unit 311 calculates the position index value that becomes closer to 1 as the comparison target region approaches the center of the image, by using the following expression (3) based on a barycentric coordinate ($x_g$, $y_g$) of the comparison target region and a central coordinate ($x_c$, $y_c$) of the image.

$$\text{position index value} = 1 - \frac{\sqrt{(x_g - x_c)^2 + (y_g - y_c)^2}}{\sqrt{x_c^2 + y_c^2}} \tag{3}$$

The corresponding region comparison unit 311 calculates the position index value for all connected regions as the target, thereby obtaining the position index value for each region included in the same connected region in each image.

In step S313, the corresponding region comparison unit 311 compares noise amounts of the comparison target regions in each image between different images. Here, it can be said that comparison target regions having smaller noise amounts have higher visibility. The noise that lowers the visibility includes high-frequency component noise having a predetermined frequency or higher. Therefore, the corresponding region comparison unit 311 performs processing of a well-known high-pass filter (see: CG-ARTS Society, "Digital Image Processing," pp. 133 to 136) on each pixel within the comparison target region, and calculates an average value within the comparison target region of the output values (pixel values) obtained after the high-pass filter processing, as the amount of noise.

Furthermore, the corresponding region comparison unit 311 calculates the noise amount index value which becomes closer to 1 as the noise amount of the comparison target region decreases, by using the following expression (4).

$$\text{noise amount index value} = 1 - \frac{N - \min(N)}{\max(N) - \min(N)} \tag{4}$$

In the expression (4), N represents the amount of noise of the comparison target region which is a target of calculating the noise amount index value; max(N) represents a maximum noise amount of the comparison target region included in the same connected region; and min(N) represents a minimum noise amount of the comparison target region included in the same connected region.

The corresponding region comparison unit 311 calculates the noise amount index value for all connected regions as the target, thereby obtaining the noise amount index value for each region included in the same connected region in each image.

In step S314, the corresponding region comparison unit 311 compares resolutions of the comparison target regions in each image between different images. Here, it can be said that comparison target regions having higher resolutions have higher visibility. It can also be said that the resolution becomes higher when the number of higher-frequency components, except for high-frequency components corresponding to noise, is large, that is, when the number of intermediate frequency components is large. Therefore, the corresponding region comparison unit 311 performs processing of a well-known bandpass filter (see: CG-ARTS Society, "Digital Image Processing," p. 136) on each pixel within the comparison target region, and calculates the average value within the comparison target region of the output values (pixel values) obtained after the bandpass filter processing, as the resolution evaluation amount. Note that a desired value is preliminarily set by the user as an intermediate frequency component to be extracted by a bandpass filter.

Further, the corresponding region comparison unit 311 calculates the resolution index value which becomes closer to 1 as the resolution evaluation amount of the comparison target region increases, by using the following expression (5).

$$\text{resolution index value} = \frac{R - \min(R)}{\max(R) - \min(R)} \tag{5}$$

In the expression (5), R represents a resolution evaluation amount of the comparison target region which is a target of calculating the resolution index value; max(R) represents a maximum resolution evaluation amount of the comparison target region included in the same connected region; and min(R) represents a minimum resolution evaluation amount of the comparison target region included in the same connected region.

The corresponding region comparison unit 311 calculates the resolution index value for all connected regions as the target, thereby obtaining the resolution index value for each region included in the same connected region in each image.

In step S315, the corresponding region comparison unit 311 compares the brightness of the comparison target region in each image. Here, it can be said that comparison target regions which are neither too bright nor too dark have higher visibility. Therefore, the corresponding region comparison unit 311 calculates an average luminance value of the comparison target region.

Further, a brightness index value which becomes closer to 1 as the brightness of the comparison target region becomes closer to a predetermined range is calculated by using the following expression (6). Note that a desired range is preliminarily set by the user as the range of the brightness.

$$\text{brightness index value} = \begin{cases} \dfrac{V}{\text{min\_th}}: & 0 \le V < \text{min\_th} \\ 1: & \text{min\_th} \le V < \text{max\_th} \\ -\dfrac{(V - \max V)}{\max V - \text{max\_th}}: & \text{max\_th} \le V < \max V \end{cases} \tag{6}$$

In the expression (6), V represents an average luminance value of the comparison target region which is a target of calculating the brightness index value; min_th represents a lower-limit luminance value in consideration of the visibility; and max_th represents an upper-limit luminance value in consideration of the visibility; and maxV represents an upper limit value of the luminance value that can be taken.

The corresponding region comparison unit 311 calculates the brightness index value for all connected regions as the target, thereby obtaining the brightness index value for each region included in the same connected region in each image.

In step S316, the region priority calculation unit 310 calculates the priority of each comparison target region based on the comparison results of the area, position, noise amount, resolution, and brightness. This priority is given by the following expression (7).

$$\text{Priority} = W_A \times (\text{area index value}) + W_P \times (\text{position index value}) + W_N \times (\text{noise amount index value}) + W_A \times (\text{resolution index value}) + W_V \times (\text{brightness index value}) \tag{7}$$

In the expression (7), $W_A$, $W_P$, $W_N$, $W_R$, and $W_V$ respectively represent weights on index values of area, position, noise amount, resolution, and brightness, and satisfy the following expression (8).

$$W_A+W_P+W_N+W_R+W_V=1 \tag{8}$$

After that, the processing returns to the main routine.

In step S302, the digest index value calculation unit 320 calculates the digest index value of each image based on the priority and the feature data of the connected region. Specifically, the average value of the priorities of the pixels included in the connected region having feature data other than zero is calculated for each image. As a result, when a larger number of regions having high priorities are present in each image, the digest index value becomes higher.

After that, the processing shifts to step S105.

As described above, according to the third embodiment, the digest index value in consideration of the priority based on the visibility of each region in each image is calculated, and the digest image is detected based on this digest index value. This enables detection of the digest image which has excellent visibility with respect to the diagnosis target depicted in the time-series images and in which the coverage characteristic is taken into consideration.

Second Modified Example

Figure 18:
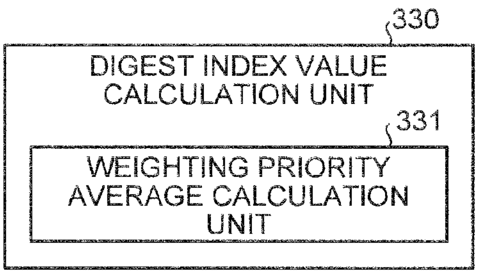
FIG. 18 is a block diagram illustrating a configuration of a digest index value calculation unit according to a second modified example.

Next, a second modified example of the third embodiment will be described with reference to FIG. 18.

An image processing apparatus according to the second modified example includes a digest index value calculation unit 330 including a weighting priority average calculation unit 331, instead of the digest index value calculation unit 320 illustrated in FIG. 14.

The weighting priority average calculation unit 331 calculates the priority based on the visibility with respect to the comparison target region in each image in step S301 illustrated in FIG. 15, and then calculates the weighting priority by multiplying the priority calculated for pixels included in each image by the feature data of the connected region including the pixels. Further, the weighting priority average calculation unit 331 calculates, for each image, the average value of the weighting priorities of the pixels included in each image. This average value of the weighting priorities is used as the digest index value.

According to the second modified example described above, weighting is performed by multiplying the priority based on the visibility of the region in each image by the feature data of the connected region, thereby enabling detection of the digest image having excellent visibility with respect to the diagnosis target depicted in the time-series images and having further improved coverage characteristic.

Note that the pixels are discriminated by the processing for each pixel in the third embodiment and the second modified example, but the same processing may be performed for each small region including a plurality of pixels.

The image processing apparatuses according to the first to third embodiments and the modified examples thereof described above can be implemented by causing a computer system, such as a personal computer or a work station, to execute an image processing program stored in a recording medium. Further, such a computer system may be used to be connected to a device, such as another computer system or a server, through a public line such as a local area network/wide area network (LAN/WAN) or the Internet. In this case, the image processing apparatuses according to the first to third embodiments may be configured to obtain image data representing images of the inside of a lumen through these networks, output the results of image processing to various output devices (a viewer, a printer, and the like) connected through these networks, or store the results of image processing in a storage device (a recording medium and a reading device for reading the reading medium, and the like) connected through these networks.

As described above, according to the first to third embodiments, the index value representing the degree of aggregation of targets depicted in time-series images is calculated based on the feature data of each connected region set by correlating the regions depicting the same target among a series of images captured in time series, and a digest image is detected based on the index value. This enables detection of the digest image of high coverage characteristic for the targets depicted in the series of images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

a processor configured to:

define a plurality of connected regions within a plurality of images, wherein at least one of the plurality of connected regions includes a plurality of regions from two or more images continuous in time series from the plurality of images, and wherein the plurality of regions of the at least one of the plurality of connected regions depict a target across the two or more images continuous in time series;

calculate a feature data of each of the plurality of connected regions;

calculate a digest index value for each of the plurality of images based on the feature data of the each of the plurality of connected regions, wherein the digest index value for the each of the plurality of images corresponds to a degree at which the target depicted in the each of the plurality of connected regions is aggregated in the each of the plurality of images; and detect a digest image from among the plurality of images, wherein the digest image is detected as having a maximum digest index value among the digest index values of the plurality of images.

2. The image processing apparatus according to claim 1, wherein the processor is configured to:

perform a correlation process comprising determining correlation between regions of the plurality of images; and connect the plurality of regions from the two or more images continuous in time series from the plurality of images to define the at least one of the plurality of connected regions based on a result of the correlation process.

3. The image processing apparatus according to claim 2, wherein the processor is configured to:

calculate an optical flow between the plurality of images; and perform the correlation process to determine the correlation between the regions of the plurality of images based on the optical flow.

4. The image processing apparatus according to claim 1, wherein the processor is configured to:

calculate a volume of the each of the plurality of connected regions as the feature data of the each of the plurality of connected regions, wherein the volume of the each of the plurality of connected regions is a sum of the number of pixels included in the each of the plurality of connected regions.

5. The image processing apparatus according to claim 1, wherein the processor is configured to calculate a degree of importance of the each of the plurality of connected regions.

6. The image processing apparatus according to claim 5, wherein the processor is configured to:

determine each of the plurality of regions in each of the plurality of images to be one of a region to be detected, a region to be examined, and a region unnecessary for examination; and calculate the degree of importance of the each of the plurality of connected regions according to which of the region to be detected, the region to be examined, and the region unnecessary for examination the each of the plurality of connected regions is determined to be.

7. The image processing apparatus according to claim 6, wherein the processor is configured to calculate the degree of importance by setting the degree of importance of the region to be detected to be higher than the degree of importance of the region to be examined and by setting the degree of importance of the region to be examined to be higher than the degree of importance of the region unnecessary for examination.

8. The image processing apparatus according to claim 1, wherein the processor is configured to calculate a summation of the amount of the feature data of the each of the plurality of connected regions for the each of the plurality of images as the digest index value for the each of the plurality of images.

9. The image processing apparatus according to claim 1, wherein the processor is configured to calculate one of:

a volume of the each of the plurality of connected regions, which is a sum of the number of pixels included in the each of the plurality of connected regions; and a degree of importance of the each of the plurality of connected regions, as the feature data.

10. The image processing apparatus according to claim 1, wherein the processor is configured to:

recognize the target corresponding to the connected region included in the digest image as a detected target; and control repetition of the calculating the digest index value for the each of the plurality of images and the detecting the digest image from among the plurality of images with respect to an undetected target.

11. The image processing apparatus according to claim 10, wherein the processor is configured to control the repetition of calculating the digest index value for the each of the plurality of images and detecting the digest image from among the plurality of images by setting the feature data of the connected region included in the detected digest image to zero.

12. The image processing apparatus according to claim 10, wherein the processor is configured to:

calculate the number of digest images detected; and control the repetition of the calculating the digest index value for the each of the plurality of images and the detecting the digest image from among the plurality of images according to the number of digest images.

13. The image processing apparatus according to claim 10, wherein the processor is configured to:

calculate a coverage of the target depicted in the plurality of images covered by the digest image; and control the repetition of the calculating the digest index value for the each of the plurality of images and the detecting the digest image from among the plurality of images according to the coverage.

14. The image processing apparatus according to claim 13, wherein the processor is configured to:

calculate the coverage from:

a sum of the feature data of connected regions of the plurality of connected regions existing in the digest image; and a sum of the feature data of all the plurality of connected regions.

15. The image processing apparatus according to claim 1, wherein the processor is configured to:

calculate a priority of detection of digest images based on visibility with respect to the regions in the plurality of images; and calculate the digest index value for the each of the plurality of images based on the priority and the feature data of the each of the each of the plurality of connected regions.

16. The image processing apparatus according to claim 15, wherein the processor is configured to:

perform a comparison of the plurality of regions belonging to the same connected region between different images; and calculate the priority based on a result of the comparison.

17. The image processing apparatus according to claim 16, wherein the processor is configured to compare areas of the respective regions.

18. The image processing apparatus according to claim 16, wherein the processor is configured to compare positions of the respective regions between the different images.

19. The image processing apparatus according to claim 16, wherein the processor is configured to compare noise amounts of the respective regions.

20. The image processing apparatus according to claim 16, wherein the processor is configured to compare resolutions of the respective regions.

21. The image processing apparatus according to claim 16, wherein the processor is configured to compare brightnesses of the respective regions.

22. The image processing apparatus according to claim 15, wherein the processor is configured to calculate a weighting priority of each of the regions by weighting the priority calculated for each of the regions in each of the plurality of images according to the feature data of the connected region including the regions, to calculate an average value of weighting priorities for each image.

23. An image processing method comprising:

defining a plurality of connected regions within a plurality of images, wherein at least one of the plurality of connected regions includes a plurality of regions from two or more images continuous in time series from the plurality of images, and wherein the plurality of regions of the at least one of the plurality of connected regions depict a target across the two or more images continuous in time series;

calculating a feature data of each of the plurality of connected regions;

calculating a digest index value for each of the plurality of images based on the feature data of the each of the plurality of connected regions, wherein the digest index value for the each of the plurality of images corresponds to a degree at which the target depicted in the each of the plurality of connected regions is aggregated in the each of the plurality of images; and detecting a digest image from among the plurality of images, wherein the digest image is detected as having a maximum digest index value among the digest index values of the plurality of images.

24. A non-transitory computer readable recording device with an executable program stored thereon, wherein the program instructs a processor to perform:

defining a plurality of connected regions within a plurality of images, wherein at least one of the plurality of connected regions includes a plurality of regions from two or more images continuous in time series from the plurality of images, and wherein the plurality of regions of the at least one of the plurality of connected regions depict a target across the two or more images continuous in time series;

calculating a feature data of each of the plurality of connected regions;

calculating a digest index value for each of the plurality of images based on the feature data of the each of the plurality of connected regions, wherein the digest index value for the each of the plurality of images corresponds to a degree at which the target depicted in the each of the plurality of connected regions is aggregated in the each of the plurality of images; and detecting a digest image from among the plurality of images, wherein the digest image is detected as having a maximum digest index value among the digest index values of the plurality of images.

* * * * *